United States Patent [19]

Santiago et al.

[11] 3,876,384
[45] Apr. 8, 1975

[54] REACTOR CONTAINING A RESILIENTLY SUPPORTED CATALYST CARRIER BODY FOR THE DETOXIFICATION OF EXHAUST GASES OF INTERNAL COMBUSTION ENGINES

[75] Inventors: Andres Santiago; Enrique Santiago, both of Augsburg, Germany

[73] Assignee: Zeuna-Staerker KG, Augsburg, Germany

[22] Filed: Mar. 19, 1973

[21] Appl. No.: 342,770

[30] Foreign Application Priority Data
Mar. 21, 1972 Germany............................ 2213540

[52] U.S. Cl.............. 23/288 F; 138/108; 138/112; 252/477 R
[51] Int. Cl............................ F01n 3/14; B01j 9/04
[58] Field of Search ......... 23/288 F, 288 R; 60/299; 252/477 R; 138/37, 108

[56] References Cited
UNITED STATES PATENTS

| | | | |
|---|---|---|---|
| 3,065,595 | 11/1962 | Gary | 23/288 F UX |
| 3,248,188 | 4/1966 | Chute | 23/288 F UX |
| 3,441,381 | 4/1969 | Keith et al. | 23/288 F |
| 3,441,382 | 4/1969 | Keith et al. | 23/288 F |
| 3,503,716 | 3/1970 | Berger | 23/288 F |
| 3,597,165 | 8/1971 | Keith et al. | 23/288 F |
| 3,600,142 | 8/1971 | Fessler | 23/288 F |
| 3,692,497 | 9/1972 | Keith et al. | 23/288 F |
| 3,771,967 | 11/1973 | Nowak | 23/288 F |
| 3,785,781 | 1/1974 | Hervert et al. | 23/288 F |
| 3,798,006 | 3/1974 | Balluff | 23/288 F |

*Primary Examiner*—Barry S. Richman
*Attorney, Agent, or Firm*—Wolfgang G. Fasse; Willard W. Roberts

[57] ABSTRACT

The monolithic catalyst carrier body is resiliently mounted in a reactor casing by surrounding the body with a protective jacket which has highly heat resistant steel reinforcing means embedded in ceramic fiber and binder means. The binder means include a fireproof mortar. Preferably a heat resistant steel wire mesh or mat is embedded between two mats of heat resistant mortar and mineral fibers.

6 Claims, 2 Drawing Figures

REACTOR CONTAINING A RESILIENTLY SUPPORTED CATALYST CARRIER BODY FOR THE DETOXIFICATION OF EXHAUST GASES OF INTERNAL COMBUSTION ENGINES

BACKGROUND OF THE INVENTION

The present invention relates to a catalyst carrier body for the detoxification of exhaust gases of internal combustion engines and to a method for making such catalyst carrier bodies. The catalyst carrier body is for example a highly brittle ceramic body having a large surface and including a plurality of flow channels for said exhaust gases on which the catalyst material is deposited.

Catalyst carrier bodies which are resilient to high temperature heat generally comprise a brittle fireproof ceramic material such as aluminum oxide, silicon oxide, magnesium oxide or zircon silicate. These ceramic materials provide a skeleton type of structure with tiny flow channels. Already small shock loads are sufficient to cause damage to the catalyst carrier body in that parts of the body break off. Due to this brittleness problems have been encountered in using this type of catalyzer in connection with motor vehicles, wherein the catalyzers are located in housings connected to the exhaust gas system and it has heretofore been difficult to support the catalyst carrier body in its housing so that the body would be substantially free of shock loads.

U.S. Pat. No. 3,441,381 granted on Apr. 29, 1969 discloses a catalyst carrier body with a protective jacket made of a putty type layer comprising fibrous aluminum silicate. The carrier body with its putty jacket is supported in a housing by means of a springy corrugated member which tightly encloses the catalyst carrier body for example in the form of a wire webbing located between the catalyst carrier body and the housing.

The just described support means for the carrier body proper according to said U.S. Pat. No. 3,441,381 are rather stiff and thus cause difficulties in mounting the catalyst carrier body in its housing because the wire webbing hinders the insertion of the catalyst carrier body into the tubular housing since the wire webbing is located in the narrow ring gap between the outer surface of the catalyst carrier body proper and the inner surface of the housing. As a result, the wire webbing may become unevenly distributed due to the assembly or the wire webbing might even be damaged.

OBJECTS OF THE INVENTION

In view of the above it is the aim of the invention to achieve the following objects singly or in combination:

to obviate the difficulties encountered by the prior art, especially to provide a catalyst carrier body which may be easily installed in its housing;

to provide a protective jacket for a catalyst carrier body which will meet all conditions regarding a shock proof support of the catalyst carrier body in its housing while simultaneously providing the desired heat insulation;

to provide a protective jacket for a catalyst carrier body which is compact but nevertheless efficiently elastically yielding to avoid any interference with the installation of the carrier body and its jacket in a suitable housing; and to provide a method of assembling the catalyst carrier body and its protective jacket in a simple and thus inexpensive way.

SUMMARY OF THE INVENTION

According to the invention there is provided a catalyst carrier body for the detoxification of exhaust gases of internal combustion engines wherein the body has a large surface and a plurality of gas flow channels, wherein the carrier body proper is wrapped by a protective jacket comprising fireproof heat insulating ceramic fibers, a reinforcement means of highly heat resistant steel components and a heat resistant binder material, whereby the ceramic fibers and the reinforcing steel components are embedded in the binder material.

The ceramic fibers may, for example, be those made of aluminum oxide. The steel components for the reinforcement may, for example, be longitudinal steel strips or steel shavings or steel wool as well as wire mesh or webbing formed into mats. The mats may also be produced of intermeshed or braided steel wires. The embedding binder material may, for example, be a fireproof mortar known as BLAKITE (RTM), which is a mortar comprising fireproof clay and cyanite mixed with water glass.

BRIEF FIGURE DESCRIPTION

In order that the invention may be clearly understood, it will now be described, by way of example, with reference to the accompanying drawings, wherein:

FIG. 1 shows a longitudinal section through a housing and a catalyst carrier body, whereby the section extends longitudinally in a plane through the center axis of the housing; and FIG. 2 is a sectional view along the section line II—II in FIG. 1.

DETAILED DESCRIPTION OF EXAMPLE EMBODIMENTS

Figure 1:
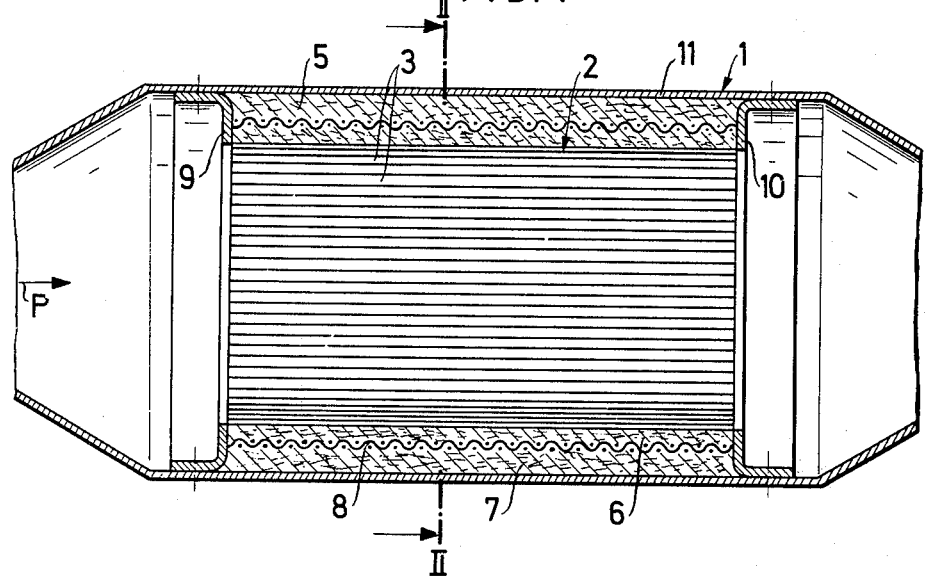
Figure 2:
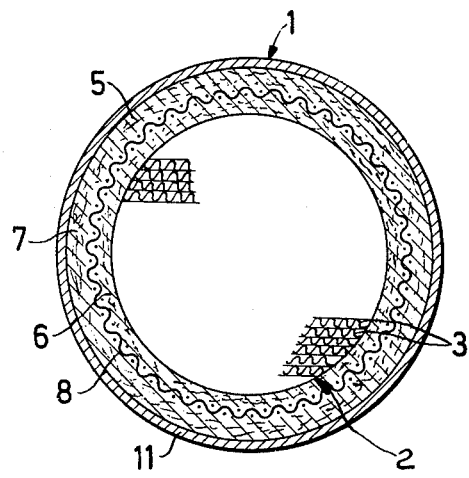

FIGS. 1 and 2 illustrate a housing 1 in which there is supported a catalyst carrier body 2 through which the exhaust gases from an engine flow in the direction of the arrow P. The exhaust gases flow through the fine channels 3 in the catalyst carrier body 2, for example, a ceramic. The catalyst carrier body 2 is enveloped by a protective jacket 5 comprising an inner layer 6 and an outer layer 7 made of fibrous materials such as ceramic fibers which are fireproof and which are embedded in a heat resistant mortar such as BLAKITE also mentioned above. Between the layers 6 and 7 there are embedded steel reinforcing means 8 which grip into both layers 6 and 7. The flanges 9 and 10 which may be secured to the inner wall surface of the housing, for example by point welding locate the catalyst carrier body 2 in the housing 1. The connection between the circumferential flange surface of the flanges 9 and 10 and the inner wall 11 of the housing 1 is gas tight and the radially inwardly facing portions of the flanges contact the protective jacket 5 around its facing surfaces to restrain the catalyst carrier body against axial movement in the housing.

The ceramic fibers of the layers 6 and 7 are for example known under the trade name FIBERFRAX or CERA-PAK. These ceramic fibers have a down type texture and are chemically stable as well as fireproof. In addition they have highly desirable heat insulating characteristics Basically these fibers comprise, for example, aluminium oxide or silicon dioxide. Further, the material known under the trade name CERAFELT which also comprises fibers of alumnium oxide and silicon dioxide is also suitable for the present purposes. It has been found to be essential that the ceramic fibers when they are embedded or baked into the binder material retain their fibrous structure or texture to assure the required elasticity of the protective jacket 5. Due to this retained elasticity the invention assures that the entire protective jacket 5 will elastically protect the ceramic body 2 against shock loads by damping these shock loads.

The binder materials which may be used for the present purposes should be heat resistant at temperatures up to 1,200°C. As mentioned, one of these materials is a mortar known under the name BLAKITE (RTM). However, any other suitable material may be used. For example, the material known as FIBERFRAX putty is also suitable for the present purposes.

The reinforcement means 8 of highly heat resistant steel may for example comprise steel wires known under the trade name KANTHAL, comprising an alloy of chromium, aluminum and/or cobalt. The housing 1 should also be constructed of highly heat resistant sheet metal. It has been found that so called THERMAX steel is suitable for this purpose. These steel alloys are heat and scale resistant at temperatures up to 1,200°C. These alloys comprise alloying components of chromium, nickel and aluminum.

It is considered to be an advantage of the invention that the ceramic fiber components and the elongated reinforcement components make it possible to provide a thicker layer of the binder material without removing the elastic characteristics of the ceramic fibers. Contrary thereto in the prior art the protective layer could be applied only relatively thinly since no body build up is possible without the reinforcing means and without destroying the elasticity of the fibers. Thus, prior art protective layers have not been suitable for the direct supporting of the catalyst carrier body relative to the housing wall. Contrary thereto the combination of ceramic fibers and reinforcing means as taught by the invention permit the build up of thicker layers of the binder material mortar. The reinforcing means provide the necessary sturdiness whereas the ceramic fibers provide the required elasticity and the respective heat insulating characteristics. As a result the invention provides a rugged compact protective jacket which results in a catalyst carrier body which is easily handled and which is easy to store and to transport. Due to the elasticity of the present protective jacket the catalyst carrier body with its jacket may rest directly against the wall of the housing. The ruggedness also permits fixing the catalyst carrier body at its facing surfaces as viewed in the flow direction, for example by means of the above described flanges. By means of these flanges it is possible to locate the catalyst carrier body rigidly and without play or movement.

An advantageous method for producing the present protective jacket according to the invention comprises the steps of first applying a layer of mineral fibers and binder materials such as mortar to the surface of the catalyst carrier body. Thereafter the steel reinforcing components are applied to the first layer and on top of the reinforcing means a second layer of mineral fibers and binder material is applied. It is especially advantageous to first prepare the layer separately as mats of mineral fibers and binder material and as a mat of steel reinforcing means such as a wire mesh or webbing and then to wrap these mats around the catalyst carrier body proper.

It is also within the teaching of the present invention that the protective jacket may be provided with projections on its inner surface which engage respective recesses in the surface of the catalyst carrier body. Further, the protective jacket may be somewhat longer than the catalyst carrier body proper so that the protruding ends of the protective jacket may be bent in such a manner that the bends are located between the circumferential facing surfaces of the catalyst carrier body and the inwardly facing surfaces of the flanges 9 and 10. The housing 1 of the present catalyzer may be an integral tubular structure preferably of cylindrical cross section, whereby the catalyst carrier body with its protective jacket may simply be inserted into the tubular housing. However, the housing may also be constructed to comprise two separate shells. This arrangement has the advantage that the catalyst carrier body may be held in position between the two shells under a biasing force which is established when the two shells are assembled or clamped together for example by welding respective flanges to each other or by inserting overlapping portions into each other.

Although the invention has been described with reference to specific example embodiments, it is to be understood, that it is intended to cover all modifications and equivalents within the scope of the appended claims.

What is claimed is:

1. In a catalytic reactor for the detoxification of exhaust gases of internal combustion engines, said reactor including a reactor casing within which a monolithic catalyst carrier body is resiliently and substantially axially supported in a spaced relationship to the inner wall of said casing and wherein said body has a large surface area and includes a plurality of flow channels for said exhaust gases, said large surface area having deposited thereon a catalyst material, and wherein a protective jacket is provided around the carrier body proper said jacket extending at least around the circumferential surface of the catalyst carrier body proper and being located between said body and said inner wall of said casing and spanning the annular space therebetween, the improvement wherein said protective jacket comprises an envelope of heat insulating fireproof ceramic fibers, heat resistant steel reinforcement means located in said envelope, and a heat resistant binder mortar in which said ceramic fibers and said reinforcement means are embedded, whereby the steel reinforcement means provide the necessary sturdiness, whereas the ceramic fibers provide the required elasticity.

2. The catalyst carrier body according to claim 1, wherein said reinforcement means comprise a sturdy wire mesh netting of highly heat resistant steel.

3. The catalyst carrier body according to claim 1, wherein said heat resistant binder mortar is a mixture of fireproof clay, cyanite and water glass.

4. A catalytic reactor for the detoxification of exhaust gases from internal combustion engines comprising; a reactor casing within which a monolithic catalyst carrier body is resiliently and substantially axially supported, said catalyst body having a large surface area having deposited thereon a catalyst material and being annularly spaced from the inner wall of said casing, a first layer of ceramic fibers embedded in a heat resistant binder mortar circumferentially mounted on the radially outer surface of said catalyst body, a heat resistant steel reinforcement means surrounding said first layer, and a second layer of ceramic fibers also embedded in a heat resistant binder mortar, said second layer surrounding said heat resistant steel reinforcement means, the combination of said first and second layers and said heat resistant reinforcement means spanning the annular space between said inner casing wall and said radially outer surface of said catalyst body and providing for the resilient support of said catalyst body in said reactor casing.

5. The catalyst carrier body according to claim 4, wherein said first and second layers of ceramic fibers and binder mortar are separate mats of which the first mat is wrapped around the carrier body proper and of which the second mat is wrapped around said steel reinforcement means.

6. The catalyst carrier body according to claim 4, wherein said heat resistant binder mortar comprises a mixture of fireproof clay, cyamite and water glass.

* * * * *